(12) United States Patent
Miyawaki et al.

(10) Patent No.: US 7,438,958 B2
(45) Date of Patent: Oct. 21, 2008

(54) SEALANT COMPOSITION FOR LIQUID CRYSTAL AND PROCESS FOR PRODUCING LIQUID-CRYSTAL DISPLAY PANEL WITH THE SAME

(75) Inventors: Takahisa Miyawaki, Sodegaura (JP); Kenichi Yashiro, Sodegaura (JP); Kei Nagata, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 594 days.

(21) Appl. No.: 10/531,279

(22) PCT Filed: Oct. 24, 2003

(86) PCT No.: PCT/JP03/13619

§ 371 (c)(1),
(2), (4) Date: Apr. 13, 2005

(87) PCT Pub. No.: WO2004/039885

PCT Pub. Date: May 13, 2004

(65) Prior Publication Data

US 2006/0006362 A1    Jan. 12, 2006

(30) Foreign Application Priority Data

Nov. 1, 2002    (JP)    ............................. 2002-319600

(51) Int. Cl.
*C09K 19/54*    (2006.01)
*G02F 1/1339*    (2006.01)
*C08G 59/14*    (2006.01)
*C08L 63/10*    (2006.01)
*C08L 83/06*    (2006.01)

(52) U.S. Cl. ...................... 428/1.53; 349/190; 525/487

(58) Field of Classification Search .................. 428/1.5, 428/1.53; 252/299.5; 349/190, 153; 525/487
See application file for complete search history.

(56) References Cited

U.S. PATENT DOCUMENTS 6,652,962 B1 * 11/2003 Sato et al. .................. 428/352

FOREIGN PATENT DOCUMENTS

| JP | 54-76698 A | 6/1979 |
| JP | 05-295087 A | 11/1993 |
| JP | 08-234216 A | 9/1996 |
| JP | 10-273644 A | 10/1998 |
| JP | 11-174673 A | 7/1999 |
| JP | 2001-064483 A | 3/2001 |
| JP | 2001-100223 A | 4/2001 |
| JP | 2001-100224 A | 4/2001 |
| JP | 2002-012818 A | 1/2002 |
| JP | 2002-179762 A | 6/2002 |
| JP | 2003-48953 A | 3/2003 |
| JP | 2003-280004 A | 10/2003 |
| TW | 405055 B | 9/2000 |
| TW | 500791 B | 9/2002 |
| TW | 550425 B | 9/2003 |

OTHER PUBLICATIONS

English abstract for JP 10-186637, 1998.*

* cited by examiner

*Primary Examiner*—Shean C Wu
(74) *Attorney, Agent, or Firm*—Buchanan Ingersoll & Rooney PC

(57) ABSTRACT

The present invention provides a liquid crystal sealing composition and a liquid crystal display panel excellent in adhesion, moisture permeation resistance and heat resistance and superior for use in a sheet press heating bonding system. The liquid crystal sealing composition comprises (1) an alkoxysilyl group-containing modified epoxy resin obtained by de-alcohol condensation reaction of (a) an epoxy resin having at least one hydroxyl group in one molecule and (b) an alkoxysilyl group-containing compound, (2) a heat latent epoxy curing agent, (3) a filler having an average particle diameter of 0.1 to 10 μm, and if necessary (4) an epoxy resin having at least 1.2 epoxy groups on average in one molecule, (5) an aprotic solvent having a boiling point in the range of 140 to 220° C., compatible with epoxy resin and inert to an epoxy group, and (6) other additives.

16 Claims, No Drawings

SEALANT COMPOSITION FOR LIQUID CRYSTAL AND PROCESS FOR PRODUCING LIQUID-CRYSTAL DISPLAY PANEL WITH THE SAME

TECHNICAL FIELD

The present invention relates to a sealing composition for liquid crystal display panel, which is excellent in adhesion, moisture permeation resistance and heat resistance, a method of producing a liquid crystal display panel by using the same, and a liquid crystal display panel.

BACKGROUND ART

In recent years, liquid crystal display panels characterized by light weight and high accuracy came to be widely used as display panels for various devices including cellular phones. As the use of the liquid crystal display panels is diversified, the environment where they are used is becoming strict. Further, liquid crystal display cells are also required to be highly accurate and uniform with high qualities.

A liquid crystal sealing composition is used to seal liquid crystals encapsulated between transparent glass substrates or plastic substrates provided suitably with transparent electrodes and an orientation film important as members constituting a liquid crystal display panel, so that the liquid crystals will not leak to the outside. In this sealing composition, an epoxy resin-based the heat cured resin composition of one-component type is widely used.

Small liquid crystal panels including cellular phones and display panels for car navigation are used outdoors or in automobiles, thus requiring improvements in impact resistance and resistance to high temperature and high humidity, and the liquid crystal sealing composition also strongly requires improvements in adhesion and heat resistance.

Generally, techniques of improving the adhesion of the heat cured epoxy resin compositions involve adding a large amount of rubber-like components such as CTBN, ATBN and ether elastomers or epoxy resin components modified with the rubber-like components in order to improve stress relaxation and adhesiveness. In this case, however, the glass transition temperature (Tg) of the resulting cured product is low due to the influence of the Tg of the rubber-like components, thus making heat resistance insufficient.

To improve the heat resistance of the epoxy resin composition used in the liquid crystal sealing composition, there is also a method of mixing a large amount of fillers such as glass fibers, glass particles and amorphous silica. In doing so, heat resistance is improved, but the resulting cured product tends to be brittle to lower adhesiveness.

In a production site for liquid crystal display panels, there is a trend that the time in a heating bonding step is reduced in order to improve the productivity of more uniform and high-quality liquid crystal display panels. From the viewpoint of productivity, a system for siamese heating press bonding of a plurality of plates is recommended and widely practiced. The system for siamese heating press bonding of a plurality of plates is a system wherein plural pairs of liquid crystal cell-forming substrates, one substrate of which is coated with a liquid crystal sealing composition, are layered, pressed under vacuum and thermally bonded in a heating furnace to produce liquid crystal display panels. A sheet press heating bonding system wherein a pair of transparent substrates for liquid crystal cell is sealed one after another by heat press bonding.

For this sheet press bonding system, for example, JP-A 10-273644 proposes a liquid crystal sealing composition comprising (a) liquid epoxy resin, (b) a curing agent consisting of novolak resin having a softening point of 75° C. or less as determined by a ring and ball method, (c) a filler having a particle diameter of 10 μm or less and (d) a curing accelerator as essential ingredients, wherein a mixture of the components (a) and (b) is liquid or has a softening point of 50° C. or less as determined by a ring and ball method. When the epoxy resin component and the curing agent component are in the form of liquid or have such low softening point, the composition undergoes rapid reduction in viscosity in a the heat cured step in the sheet press heating bonding system, thus easily bringing about a phenomenon such as burnout in a seal form or foaming in the seal. Further, the glass transition temperature of the cured liquid crystal sealing composition tends to be lowered to deteriorate heat resistance.

JP-A 2001-64483 proposes a sealing composition for liquid crystal display panel, which comprises epoxy resin, a curing agent, epoxylated polybutadiene and an inorganic filler. In this publication, the epoxylated polybutadiene component is essential. This sealing composition is excellent in retention of seal shape in the sheet press heat bonding system, but the glass transition temperature of the epoxylated polybutadiene component is low, and thus the glass transition temperature of the cured liquid crystal sealing composition is also lowered, thus easily deteriorating heat resistance.

Accordingly, the object of the present invention is to provide a novel liquid crystal sealing composition which is compatible with the sheet press heating bonding system, can demonstrate high-speed production and is superior in cell adhesion, moisture permeation resistance and heat resistance.

DISCLOSURE OF INVENTION

To solve the problem described above, the present inventors made extensive study, and as a result they found that the problem can be solved by the following liquid crystal sealing composition, and the present invention was thereby completed.

That is, the liquid crystal sealing composition of the present invention comprises (1) analkoxysilyl group-containing modified epoxy resin obtained by de-alcohol condensation reaction of (a) an epoxy resin having at least one hydroxyl group in one molecule and (b) analkoxysilyl group-containing compound, (2) a heat latent epoxy curing agent, (3) a filler having an average particle diameter of 0.1 to 10 μm, and if necessary (4) an epoxy resin having at least 1.2 epoxy groups on average in one molecule, (5) an aprotic solvent having a boiling point in the range of 140 to 220° C., compatible with epoxy resin and inert to an epoxy group, and (6) other additives.

The method of producing a liquid crystal display panel according to the present invention comprises the heat cured above-described liquid crystal sealing composition in a liquid crystal sheet press heating bonding system.

The liquid crystal display panel of the present invention is characterized in that it is produced by the liquid crystal display panel production method described above.

BEST MODE FOR CARRYING OUT THE INVENTION

Hereinafter, the liquid crystal sealing composition used in the present invention is described in more detail.

Specifically, the liquid crystal sealing composition of the present invention comprises (1) an alkoxysilyl group-containing modified epoxy resin obtained by de-alcohol condensation reaction of (a) an epoxy resin having at least one hydroxyl group in one molecule and (b) an alkoxysilyl group-containing compound, (2) a heat latent epoxy curing agent, (3) a filler having an average particle diameter of 0.1 to 10 μm, and if necessary (4) an epoxy resin having at least 1.2 epoxy groups on average in one molecule, (5) an aprotic solvent having a boiling point in the range of 140 to 220° C., compatible with epoxy resin and inert to an epoxy group, and (6) other additives. Now, these components are specifically described.

(1-1) Alkoxysilyl Group-Containing Modified Epoxy Resin (a) Epoxy resin having at least one hydroxyl group in one molecule The epoxy resin is not particularly limited insofar as it is one kind of epoxy resin satisfying the above requirement. Examples include bisphenol epoxy resin, carboxylic acid-modified epoxy resin, and glycidyl group- and hydroxyl group-containing radical copolymers, etc.

[Bisphenol Epoxy Resin]

The bisphenol epoxy resin is represented by the following formula (1):

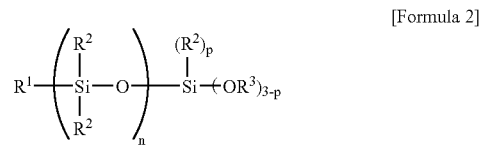

[Formula 2]

wherein $R^1$ represents a C1 to C8 alkyl group, a phenyl group or a C1 to C8 alkenyl group, each of which may have an alkoxy group, vinyl group, (meth) acryloyl group, carboxyl group, epoxy group, glycidyl group, amino group and mercapto group, $R^2$ represents a C1 to C8 alkoxysilyl group, an alkyl group or a phenyl group, $R^3$ represents a C1 to C8 alkyl group, n is an integer of 0 to 6, and p is an integer of 0 to 2. Examples of the alkoxysilyl group-containing compound include tetraalkoxysilane such as tetramethoxysilane, tetraethoxysilane, tetrapropoxysilane, tetraisopropoxysilane and tetrabutoxysilane, and trialkoxysilane such as methyltrimethoxysilane, methyltriethoxysilane, methyltripropoxysi-

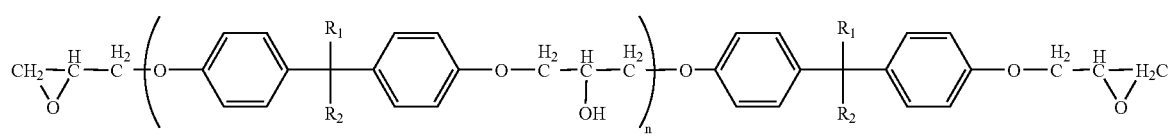

[Formula 1]

wherein $R_1$ and $R_2$ each represent a methyl group or a hydrogen atom, n is the number of repeating units, and when the bisphenol epoxy resin contains a resin wherein n is 1 or more, a considerable amount of the resin wherein n is 0 may be contained. Specific examples of the bisphenol epoxy resin include bisphenol A epoxy resin, bisphenol F epoxy resin, bisphenol AD epoxy resin etc. Hydrogenated products of the bisphenol epoxy resin can also be preferably used.

[Carboxylic Acid-Modified Epoxy Resin]

A carboxyl modified epoxy resin which has formed secondary hydroxyl groups in the molecule by previously reacting a part of epoxy groups in the epoxy resin with e.g. a compound containing at least one carboxyl group in the molecule can also be preferably used. In this case, the carboxyl modified epoxy resin which has formed secondary hydroxyl groups in the molecule can be obtained by reacting 0.01 to 0.6 equivalent of carboxyl group in the compound having at least one carboxyl group in the molecule, with 1 equivalent of epoxy group in the epoxy resin, in the presence of a basic catalyst.

[Glycidyl Group- and Hydroxyl Group-Containing Radical Copolymer]

A radical copolymer having both glycidyl and hydroxyl groups in one molecule, such as copolymers of glycidyl group-containing radical copolymerizable monomers such as glycidyl (meth)acrylate, hydroxyl group-containing radical monomers such as hydroxyethyl (meth)acrylate, and other copolymerizable monomers can also be preferably used.

(b) Alkoxysilyl Group-Containing Compound

The alkoxysilyl group-containing compound (b) used in the present invention is represented by formula (2):

lane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-methacryloxypropyltrimethoxysilane, 3-acryloxypropyltrimethoxysilane, 3-methacryloxypropyltriethoxysilane, 3-acryloxypropyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, phenyltrimethoxysilane, phenyltriethoxysilane, N-2-(aminoethyl)-3-aminopropyltrimethoxysilane, 3-aminopropyltriethoxysilane, 3-aminopropyltrimethoxysilane, 3-aminopropyltriethoxysilane and N-phenylaminopropyltrimethoxysilane.

Partial condensation products of the above compounds can also be preferably used.

(1-2) Method of Producing the Alkoxysilyl Group-Containing Modified Epoxy Resin

The method (1-2) of producing the alkoxysilyl group-containing modified epoxy resin includes, but is not limited to, methods of modification described in for example JP-A 2001-59011, JP-A 2002-249539 etc.

The method is carried out by introducing (a) epoxy resin containing at least one hydroxyl group in one molecule and (b) alkoxysilyl group-containing compound and reacting them under heating and simultaneously distilling a byproduct alcohol away. The reaction temperature is 50 to 130° C., preferably 70 to 110° C., and the total reaction time is about 1 to 24 hours. This reaction is conducted desirably under substantially water-free conditions so that the polycondensation reaction of the alkoxysilyl group-containing compound (b) itself can be prevented from proceeding to a too high degree. In the de-alcohol condensation reaction, a conventionally known accelerator can be used for promoting the reaction. The accelerator includes, for example, organometallic compounds such as dibutyltin dilaurate and zinc stearate.

The reaction can be carried out in a solvent or without a solvent. The solvent is preferably an organic solvent which is excellent in the ability to solubilize (a) epoxy resin having at least one hydroxyl group in one molecule and (b) alkoxysilyl group-containing compound and which is inert to these compounds. Such organic solvent includes aprotic solvents, for example, ketone solvents such as methyl ethyl ketone and cyclohexanone, ester solvents such as ethyl acetate and butyl acetate and aromatic solvents such as toluene and xylene.

With respect to the ratio of (b) alkoxysilyl group-containing compound to (a) epoxy resin having at least one hydroxyl group in one molecule, the hydroxyl equivalent of the epoxy resin (a)/alkoxysilyl equivalent of the alkoxysilyl group-containing compound (b) is preferably in the range of 0.01 to 0.5. An equivalent ratio outside of this range is not preferable because when the equivalent ratio is less than 0.01, the alkoxysilyl group-containing compound in an unreacted form is increased, while when the ratio is higher than 0.5, sufficient heat resistance cannot be achieved. The unreacted epoxy resin component and the unreacted alkoxysilyl group-containing compound may be contained in the alkoxysilyl group-containing silane modified epoxy resin (1) thus obtained.

The modified state of the hydroxyl group-containing epoxy resin (a) modified with the alkoxysilyl group-containing compound (b) can be confirmed for example with $^1$H-NMR (CDCl$_3$ solution) by examining that a methine peak (in the vicinity of 3.3 ppm) of the epoxy ring is maintained and a peak of hydroxyl group (in the vicinity of 3.85 ppm) in the epoxy resin has disappeared.

The amount of the alkoxysilyl group-containing modified epoxy resin (1) in the liquid crystal sealing composition is contained preferably in an amount of 1 to 30% by weight based on 100% by weight of the liquid crystal sealing composition. This range is preferable because the liquid crystal sealing composition is superior in heat resistance and adhesiveness because of excellent viscosity stability and high Tg of its cured product.

(2) Heat Latent Epoxy Curing Agent

As the heat latent epoxy curing agent (2) used in the present invention, a known heat latent epoxy curing agent capable of conferring curing reaction on the epoxy resin upon heating can be selected and used.

Examples of the known heat latent epoxy curing agent include an imidazole adduct-based curing agent, dicyandiamide modified curing agent, dicyandiamide, dihydrazide-based curing agent, imidazole-based curing agent, amine adduct-based curing agent, amine/acid anhydride adduct-based curing agent, polyvalent phenol compound and acid anhydride-based curing agent etc.

The heat latent epoxy curing agent (2) desirably contains at least one kind of amine-based curing agent having a melting point or a softening point (determined by a ring and ball method) of 100° C. or more. The amine-based curing agent includes, for example, an imidazole-based adduct curing agent, dicyandiamide modified curing agent, 1,8-diazabicyclo(5,4,0) undecene-7 derivative, dicyandiamide, dihydrazide-based curing agent, amine based-adduct curing agent, imidazole derivative etc. The heat latent epoxy curing agent (2) used is more preferably at least one kind of imidazole-based curing agent having a melting point of 130° C. or more. Examples of the imidazole-based curing agent having a melting point of 130° C. or more include 1-cyanoethyl-2-phenylimidazolium trimellitate (melting point 175° C. to 183° C.), 2-phenylimidazole isocyanuric acid adduct (melting point 135° C.), 2,4-diamino-6-[2'-methylimidazolyl-(1')]-ethyl-s-triazine (melting point 248° C. to 258° C.) etc.

The heat latent epoxy curing agent (2) is contained in an amount of 2 to 40% by weight based on 100 parts by weight of the liquid crystal sealing composition of the present invention. In this range, the curing of the liquid crystal sealing composition of the present invention is sufficient, the Tg of its curing product and adhesiveness are excellent, and the viscosity stability of the composition at room temperature is suitable.

[Working Effect of the Amine-Based Curing Agent in a Pre-Cure Step in Production of a Liquid Crystal Cell]

The alkoxysilyl group-containing modified epoxy resin (1) has, in its molecule, analkoxy group derived from the alkoxysilyl group-containing compound (b). In a pre-cure step for producing a liquid crystal display cell, it is preferable that the alkoxysilyl group-containing compound (b) in the liquid crystal sealing composition undergoes sol/gel curing thus substantially eliminating alcohol to make (1) substantially free of the alkoxysilyl group, in order to improve the outward appearance of the seal after attachment of panels. When the sol/gel curing of the alkoxysilyl group group-containing modified epoxy resin in the pre-cure step is insufficient, de-alcohol condensation reaction may, due to the residual alkoxysilyl group in the seal, proceed in the step of heating press bonding with a sheet hot press, to cause a deterioration in outward appearance due to foaming etc. in the seal. It is preferable that the amine-based curing agent is present in the liquid crystal sealing composition, because de-alcohol condensation reaction can, due to sol/gel curing, be promoted in the pre-cure step carried out usually at a temperature of 60 to 110° C. as described later, and thus after the pre-cure step, the alkoxy group is substantially not present. Further, this amine-based curing agent can also function as a curing agent for the epoxy resin component in a subsequent heat curing step.

The heat latent epoxy curing agent (2) is preferably an imidazole-based curing agent having a melting point of 130° C. or more, from the viewpoint of excellent viscosity stability of the liquid crystal sealing composition of the present invention, the sol/gel curing of the alkoxysilyl group in the pre-cure step, and the curing of the epoxy resin component in a heat curing step.

(3) Filler Having an Average Particle Diameter of 0.1 to 10 μm

The filler (3) having an average particle diameter of 0.1 to 10 μm used in the present invention may be any filler which can be usually used in the field of electronic material. Specific examples include inorganic fillers such as calcium carbonate, magnesium carbonate, barium sulfate, magnesium sulfate, aluminum silicate, zirconium silicate, iron oxide, titanium oxide, aluminum oxide (alumina), zinc oxide, silicon dioxide, potassium titanate, kaolin, talc, asbestos powder, quartz powder, mica, glass fiber etc. Known organic fillers such as polymethyl methacrylate, polystyrene and copolymers thereof with copolymerizable monomers, and core/shell type acryl particles can also be used.

Before use, the filler (3) maybe graft-modified with epoxy resin, silane coupling agent etc.

The average particle diameter of the filler (3) used in the present invention is 0.1 to 10 μm, preferably 0.3 to 5 μm, as determined by a laser. An average particle diameter within this range is preferable because the dimensional stability of the width of a cell gap is further improved in production of liquid crystal cells.

The amount of the filler (3) used in the present invention is preferably 5 to 30% by weight, more preferably 10 to 20% by weight, based on 100% by weight of the whole liquid crystal sealing composition. It is preferable that the amount of the filler used is in the above range, because the application stability of the liquid crystal sealing composition onto a glass substrate is excellent, and the dimensional stability in the width of a cell gap is also excellent.

(4) Epoxy Resin Having at Least 1.2 Epoxy Groups on Average in One Molecule

In the liquid crystal sealing composition of the present invention, epoxy resin not modified with alkoxysilyl can be used in combination with the alkoxysilyl group-containing epoxy resin (1). The epoxy resin used in combination is desirably epoxy resin having at least 1.2 epoxy groups on average in one molecule, preferably at least 1.7 epoxy groups on average in one molecule, particularly preferably 2 to 6 epoxy groups on average. When at least 1.2 epoxy groups on average are present in one molecule, heat resistance is preferably improved. These epoxy resins may be used singly or as a mixture of resins different from one another, and can be used regardless whether they are solid or liquid at room temperature.

These epoxy resins are not particularly limited insofar as they are epoxy resin containing a predetermined amount of epoxy group or a mixture thereof, and a mixture of a monofunctional epoxy resin and a multifunctional epoxy resin, a single multifunctional epoxy resin, or a mixture thereof can be used. Modified epoxy resins thereof can also be used. The number of functional groups of the epoxy resin in the liquid crystal sealing composition can be determined from the epoxy group equivalent and weight-average molecular weight of the epoxy resin separated by liquid chromatography. Examples of the epoxy resin (4) having at least 1.2 epoxy groups in one molecule include aliphatic glycidyl ether compounds, aromatic glycidyl ether compounds, trisphenol glycidyl ether compounds, hydroquinone glycidyl ether compounds, resorcinol glycidyl ether compounds, aliphatic glycidyl ester compounds, aromatic glycidyl ester compounds, aliphatic glycidyl ether ester compounds, aromatic glycidyl ether ester compounds, alicyclic glycidyl ether compounds, aliphatic glycidyl amine compounds, bisphenol glycidyl ether compounds, aromatic glycidyl amine compounds, hydantoin glycidyl compounds, biphenyl glycidyl compounds, novolak glycidyl ether compounds, glycidyl group-containing (meth)acrylic copolymers, epoxylated diene polymers etc. Epoxy resin and modified epoxy resin other than those described above can also be simultaneously used.

[Modified Epoxy Resin]

As the epoxy resin (4) having at least 1.2 epoxy groups in one molecule, modified epoxy resin other than the alkoxysilyl group-containing modified epoxy resin can also be mixed and used in such a range that the characteristics of the sealing composition of the present invention are not deteriorated. Examples of the modified epoxy resin include urethane modified epoxy resin, polysulfide modified epoxy resin, rubber modified epoxy resin (modified with CTBN, ATBN etc.), polyalkylene glycol epoxy resin, bisphenol A epoxy resin having ether elastomers added thereto, acryl modified epoxy resin etc. The liquid crystal sealing composition of the present invention is particularly preferably the one having a rubber modified product maintained as particles in the epoxy resin. When these modified epoxy resins are simultaneously used, the stress relaxation of the liquid crystal sealing composition may be improved to exhibit further improved adhesion.

(5) Aprotic Solvent Compatible with Epoxy Resin, Inert to an Epoxy Group and Having a Boiling Point in the Range of 140 to 220° C.

To improve dispense coating properties and screen printing properties, the liquid crystal sealing composition of the present invention can employ the aprotic solvent (5) compatible with epoxy resin, inert to an epoxy group and having a boiling point in the range of 140 to 220° C.

The amount of the aprotic solvent (5) inert to an epoxy group used in the present invention is preferably 5 to 30% by weight based on 100% by weight of the liquid crystal sealing composition. An amount of the solvent in the above range is preferable because the resulting composition is excellent in wetting properties on an adherent such as a glass substrate or the like and superior in dispense coating properties and screen printing properties.

The aprotic solvent (5) inert to epoxy resin is selected from solvents compatible with epoxy resin, inert to epoxy resin and having a boiling point in the range of 140 to 220° C. Specific examples include ketone solvents such as cyclohexanone and methyl cyclohexane, ether solvents such as diethylene glycol diethyl ether and diethylene dibutyl ether, and ester solvents such as propylene glycol diacetate and propylene glycol methyl ether acetate. Use of a protonic solvent such as propylene glycol methyl ether and dipropylene glycol methyl ether is not preferable because the de-alcohol reaction of the alkoxysilyl group-containing epoxy resin (1) is readily promoted during storage to deteriorate the viscosity stability of the liquid crystal sealing composition.

(6) Other Additives

In the present invention, additives such as an ion trapping agent, an ion exchanger, a leveling agent, a pigment, a dye, a plasticizer and a defoaming agent can be used.

Method of Preparing the Liquid Crystal Sealing Composition

Preparation of the liquid crystal sealing composition is not particularly limited, and involves suitably adding and mixing (1) an alkoxysilyl group-containing modified epoxy resin, (2) a heat latent epoxy curing agent, (3) a filler having an average particle diameter of 10 μm or less, and if necessary (4) an epoxy resin having at least 1.2 epoxy groups on average in one molecule, (5) an aprotic solvent having a boiling point in the range of 140 to 220° C., compatible with epoxy resin and inert to an epoxy group, and (6) other additives. In this mixing, for example, the composition is kneaded by known kneading machines such as a two-arm stirrer, a roll kneader, a twin-screw extruder, a ball mill kneader etc., and finally the composition is charged and sealed in a glass bottle or a plastic container after defoaming under vacuum.

Physical Properties of the Liquid Crystal Sealing Composition

The viscosity of the liquid crystal sealing composition before curing is not particularly limited, but the viscosity at 25° C. by an E-type viscometer is in the range of preferably 1 to 1000 Pa·s, more preferably 5 to 500 Pa·s, still more preferably 10 to 200 Pa·s.

Method of Producing the Liquid Crystal Display Panel

The liquid crystal display panel of the present invention is produced by printing or dispense-applying the liquid crystal sealing composition of the present invention on a site for constituting a bonding seal of a substrate for glass or plastic liquid crystal cell, then pre-curing at 60 to 110° C., registering it on another substrate to form a pair of attached substrates, pressing the paired substrates under heating at 100 to 160° C., and joining and fixing the paired substrates to a uniform thickness in the range of 2 to 7 μm. For bonding sealing with the liquid crystal sealing composition by complete curing, it is necessary that the liquid crystal sealing composition is pre-cured to remove a methanol component and volatiles completely from the liquid crystal sealing composition. General pre-curing conditions are selected such that that the temperature is in the range of 60 to 110° C., and the heating time is 5 to 60 minutes. A higher pre-curing temperature is preferable for heating in a short time. The liquid crystal cell substrate used includes, for example, a glass substrate, plastic substrate etc. Among the substrates mentioned above, a glass or plastic substrate for constituting a liquid crystal cell, which is provided with an orientation film represented by indium tin oxide, an orientation film represented by polyimide, and another inorganic ion-shielding film in necessary regions, is used. The method of applying the liquid crystal sealing composition onto the substrate is not particularly limited, and the liquid crystal sealing composition can be applied for example by a screening printing coating method or dispenser coating method. After application, a pair of substrates are attached by pre-heating and joined to each other by pressing, bonding and sealing under heating, and the thermal curing conditions are not particularly limited, and curing is conducted at about 100 to 160° C. for 0.5 to 24 hours.

In production with a sheet heat press in the heat press and bonding step, the conditions of securing retention of a temporary gap are not particularly limited, but preferably the liquid crystal display panel is produced through two or more heating steps or aging steps wherein a pair of substrates are joined at 100 to 160° C. for about 2 to 10 minutes, then removed under relieved pressure, and completely cured and aged in a heating oven regulated at the same temperature.

The sheet heat press refers to a heat pressing machine which joins a pair of substrates one after another, including a vacuum sheet heat press such as a sheet heat press capable of heating under vacuum and a rigid sheet heat press for forcibly heating, pressing and joining a pair substrates via a hot plate at the atmospheric pressure. Either sheet heat press system may be used. In addition to the sheet heat press, a multi-stage heat press can also be used in the heat press and bonding step.

Liquid Crystal Display Panel

The liquid crystal display panel of the present invention is produced by printing or dispense-applying the liquid crystal sealing composition of the present invention on a site for constituting a bonding seal of a substrate for glass or plastic liquid crystal cell, then pre-curing at 60 to 110° C., registering it on another substrate to form a pair of attached substrates, pressing the paired substrates under heating at 100 to 160° C., and joining and fixing the paired substrates to a uniform thickness in the range of 2 to 7 μm, and the liquid crystal display panel is a liquid crystal display element obtained by injecting a liquid crystal material into the cell and sealing its injection hole with a two-pack setting or UV-setting liquid crystal seal material composition. The two-pack setting or UV-setting liquid crystal sealing composition may be a known composition. The liquid crystal material is not limited, and a nematic liquid crystal and ferroelectric liquid crystal is preferable.

Preferable examples of the liquid crystal display panel obtained in the present invention include a TN (twisted nematic) liquid crystal element or STN (super twisted nematic) liquid crystal element proposed by M. Schadt and W. Helfrich or a ferroelectric liquid crystal element proposed by N. A Clark and S. T. Lagerwall, or a liquid crystal display element having a thin film transistor arranged in each pixel.

EXAMPLES

Hereinafter, the present invention is described in more detail by reference to the Examples, but the present invention is not limited thereto. The terms "%" and "parts" in the Examples refer to % by weight and parts by weight, respectively. The materials used in the Examples are shown below.

[Test Method]

(Measurement of Glass Transition Temperature of Cured Liquid Crystal Sealing Agent)

The liquid crystal sealing agent was applied to a thickness of 100 μm in terms of cured product to form a thin film, then pre-cured at 90° C. for 10 minutes and heat-treated at 120° C. for 60 minutes to form a cured product of about 100 μm in thickness. The dynamic viscoelasticity of the cured product was measured by Rheograph Solid L-1R manufactured by Toyo Seiki Seisakusho, at a frequency of 10 Hz and at an increasing temperature of 5° C./min., and the peak-top temperature of loss tangent (Tan δ) was calculated and expressed as glass transition temperature (Tg)

(Bonding Sealing Test)

The liquid crystal display test panel produced via the sheet press curing step under the conditions shown in Example 1 was observed under a test glass (magnification: ×20) to determine whether the seal line was disturbed or not and whether seal defects were caused due to defoaming in the seal.

(Adhesion Test)

This test was carried out according to JIS K6850. SUS304 was used as adherent. The liquid crystal sealing composition was applied onto an area of 25 mm×10 mm in the adherent, and the resulting test specimen was pre-cured at 90° C. for 10 minutes, attached and fixed with a jig, and heat-treated at 120° C. for 60 minutes to prepare an adhesion test specimen. Adhesive strength under shear was measured by a tensile testing machine (Intesco [phonetic]). In the Examples, a test specimen showing an excellent adhesion that is, an adhesive strength of 20 MPa or more, was designated ○, a test specimen showing a slightly inferior adhesion, that is, an adhesive strength of 10 to 20 MPa, was designated Δ, and a test specimen showing an inferior adhesion, that is, an adhesive strength of less than 10 MPa, was designated x.

(Heat Resistant Adhesion Test)

An adhesion test specimen prepared in the same manner as in the adhesion test was measured for its adhesive strength under shear in the same manner as in the adhesion test under the condition of 120° C. In the Examples, a test specimen showing excellent adhesion, that is, an adhesive strength of 20 MPa or more, was designated ○, a test specimen showing slightly inferior adhesion, that is, an adhesive strength of 10 to 20 MPa, was designated Δ, and a test specimen showing inferior adhesion, that is, an adhesive strength of less than 10 MPa, was designated x.

(Adhesion Test)

An adhesion test specimen prepared in the same manner as in the adhesion test was examined for its adhesive strength under shear in a pressure cocker test under the conditions of 121° C., 2 atmospheric pressure and 100% humidity for 20 hours. In the Examples, a test specimen showing excellent adhesion, that is, an adhesive strength of 20 MPa or more, was designated ○, a test specimen showing slightly inferior adhesion, that is, an adhesive strength of 10 to 20 MPa, was designated Δ, and a test specimen showing inferior adhesion, that is, an adhesive strength of less than 10 MPa, was designated x.

[Used Materials etc.]

(1) Alkoxysilyl Group-Containing Modified Epoxy Resin

The alkoxysilyl group-containing modified epoxy resins in Synthesis Examples 1 and 2 below were synthesized and used.

Synthesis Example 1

In a four-necked flask equipped with a stirrer, a water separator quipped with a condenser, a thermometer and a nitrogen inlet tube, 200 g methyl ethyl ketone was added to 900 g bisphenol F epoxy resin (Epichlone 830S, epoxy equivalent 175/eq, manufactured by Dainippon Ink and Chemicals, Inc.), and then 5 g N-phenyl-γ-aminopropyltri-methoxysilane (trade name: KBM573, manufactured by Shin-Etsu Chemical Co., Ltd.) was added thereto, and the mixture was heated to 60° C. and dispersed uniformly. 400 g tetramethoxysilane (trade name: KBM04, manufactured by Shin-Etsu Chemical Co., Ltd.) was added thereto, and further 1 g dibutyltin dilaurate (tradename: Neostan U-100, manufactured by Nitto Kasei Co., Ltd.) was added thereto, and while formed methanol was distilled away, the mixture was heat-treated at 80° C. for 5 hours and then treated under reduced pressure at a similar temperature, whereby methyl ethyl ketone was distilled away, and methoxysilyl group-containing modified epoxy resin was produced. The epoxy equivalent of the resulting methoxysilyl modified epoxy resin was 305 g/eq.

Synthesis Example 2

In a four-necked flask equipped with a stirrer, a water separator equipped with a condenser, a thermometer and a nitrogen inlet tube, 200 g methyl ethyl ketone was added to 900 g hydroxy group-containing acrylic resin (Almatex PD 1700, epoxy equivalent 175/eq, hydroxyl equivalent 1100 g/eq., manufactured by Mitsui Chemicals), and the mixture was heated to 60° C. and dispersed uniformly. 200 g tetramethoxysilane (trade name: KBM04, manufactured by Shin-Etsu Chemical Co., Ltd.) was added thereto, and further 1 g dibutyltin dilaurate (trade name: Neostan U-100, manufactured by Nitto Kasei Co., Ltd.) was added thereto, and while formed methanol was distilled away, the mixture was heat-treated at 80° C. for 5 hours and then treated under reduced pressure at a similar temperature, whereby methyl ethyl ketone was distilled away, and methoxysilyl group-containing modified epoxy resin was produced. The epoxy equivalent of the resulting methoxysilyl modified epoxy resin was 916 g/eq.

(2) Heat Latent Epoxy Curing Agent 3-bis(hydrazinocarboethyl)-5-isopropyl hydantoin having a melting point of 120° C. (trade name: Amicure VDH-J, manufactured by Ajinomoto) as a hydrazide curing agent, 2,4-diamino-6-[2'-ethyl-4'-methylimidazolyl-(1')]-ethyl-s-triazine (melting point of 248 to 258° C., trade name: Curezole 2E4MZ-A, manufactured by Shikoku Chemicals Corporation) as an imidazole curing agent, and xylylene phenol resin (trade name: Mirex XLC-LL (softening point 76.5° C.) as a phenol curing agent were selected and used.

(3) Filler Having an Average Particle Diameter of 0.1 to 10 μm

Vikarox CR-10 [phonetic] (trade name) (average particle diameter 0.4 μm) manufactured by Vikousky [phonetic] was selected and used as amorphous alumina, and F351 (trade name) (average particle diameter 0.2 μm) manufactured by Zeon Kasei was selected and used as organic filler. MU-120 (tradename) (primary average particle diameter of 0.02 μm as determined by observation under an electron microscope) manufactured by Shin-Etsu Chemical Co., Ltd was used as amorphous silica in the Comparative Examples.

(4) Epoxy Resin

As the epoxy resin, bisphenol A liquid epoxy resin (trade name: Epomic R-140P; epoxy equivalent, 185 g/eq., manufactured by Mitsui Chemicals), o-cresol novolak epoxy resin (trade name: EOCN-1020-75; epoxy equivalent 200 g/eq., softening point of 75° C., manufactured by Nihon Kayaku), and acryl rubber modified epoxy resin according to Synthesis Example 3 below were selected and used.

Synthesis Example 3

Synthesis of Acryl Rubber Modified Epoxy Resin

A 2000-ml four-necked flask equipped with a stirrer, a gas inlet tube, a thermometer and a condenser was charged with 600 g bisphenol A epoxy resin (Epomik R-140P manufactured by Mitsui Chemicals) as liquid epoxy resin, 12 g acrylic acid, 1 g dimethyl ethanol amine and 50 g toluene, and the mixture was reacted at 110° C. for 5 hours to introduce double bonds by introducing air. While nitrogen was introduced into the reaction system, 350 g butyl acrylate, 20 g glycidyl methacrylate, 1 g divinyl benzene, 1 g azobisdimethyl valeronitrile and 2 g azobisisobutyronitrile were added thereto and reacted at 70° C. for 3 hours and further at 90° C. for 1 hour. Then, toluene was removed at 110° C. under reduced pressure, and the composition was rapidly cured at low temperatures in the presence of a photo curing catalyst to give acryl rubber modified epoxy resin having uniformly dispersed fine crosslinked acryl rubber particles having an average particle diameter of 0.05 μm as determined by measuring the dispersed rubber particle diameter by observing the morphology of a ruptured surface of the cured product under an electron microscope.

(5) Solvent

Propylene glycol diacetate (trade name: Dowanol PGDA, manufactured by Dow Chemical) (melting point: 191° C.) was selected and used as the aprotic solvent compatible with epoxy resin, inert to an epoxy group, and having a boiling point in the range of 140 to 220° C.

Example 1

30 parts of xylylene phenol resin (trade name: Mirex XLC-LL, manufactured by Mitsui Chemicals) and 10 parts of o-cresol novolak epoxy resin (trade name: EOCN-1020-75, manufactured by Nippon Kayaku) were added to 15 parts of propylene glycol diacetate (trade name: Dowanol PGDA, manufactured by Dow Chemical), and the mixture was heated and dissolved, and then 15 parts of the alkoxylsilyl group-containing modified epoxy resin in Synthesis Example 1, 10 parts of the acryl modified epoxy resin in Synthesis Example 3, 3 parts of Curezole 2E4MZ-A and 17 parts of CR-10 as filler were preliminarily mixed with a mixer and kneaded until the size of the solid materials was reduced to 5 μm or less with a triple roll mill, and the resulting kneaded product was defoamed under vacuum to give a liquid crystal sealing composition (P1).

The liquid sealing composition (P1) exhibited an initial viscosity of 50 Pa·s at 25° C. by an E type viscometer. The results of the joining seal test of the liquid crystal sealing composition (P1), the glass transition temperature measurement of the cured product, the adhesion test, the heat resistant adhesion test, and adhesion test are shown in Table 2.

The joining seal test was carried out in the following manner. 5 parts of 5 μm short glass fiber spacer was blended with 100 parts of the liquid crystal sealing composition (P1), and the mixture was sufficiently mixed to give a vacuum-degassed composition. The resulting composition was first applied by a dispenser to form a pattern consisting of 4 cells of 1 inch per liquid crystal cell glass substrate (hereinafter, referred to as ITO substrate) provided with a transparent electrode and an orientation film to give an ITO substrate having a seal coating with a width of about 0.7 mm and a seal coating thickness of about 22 to 25 μm. Thereafter, the substrate was dried in a hot air dryer at 90° C. for 10 minutes, followed by placing and registering another ITO substrate on the substrate and subjecting the paired substrates 10 times to primary joining sealing (pressure 0.03 MPa/cm², 160° C./6 min.) on a rigid sheet heat press manufactured by Joyo Kogaku. As a result, there was no sample having seal defects or a disturbed seal line attributable to generation of foam penetrating the seal, and every liquid crystal display cell substrate thus produced had a desired cell gap of 5±0.1 μm.

Examples 2 to 5

According to the formulation in Table 1, the liquid crystal sealing compositions according to the present invention were produced in the same manner as in Example 1 and evaluated in the same manner as in Example 1.

Comparative Examples 1 to 3

Liquid crystal sealing compositions (C1 to C3) were produced in the same manner as in Example 1 except that the alkoxysilyl group-containing modified epoxy resin was not used, and a silane coupling agent component was used as an additive component, and the compositions were evaluated in the same manner as in Example 1.

As is evident from the results in Table 2, it was confirmed that the liquid crystal sealing compositions of the present invention are suitable for the sheet press heat bonding system and excellent in adhesion and heat resistance.

In Comparative Examples 1 to 3, on the other hand, the alkoxysilyl group-containing modified epoxy resin is not used, and thus the compositions are unsuitable for the sheet press heat bonding system and inferior in adhesion and heat resistance.

TABLE 1

| Composition | | Examples | | | | | Comparative Examples | | |
|---|---|---|---|---|---|---|---|---|---|
| | | P1 | P2 | P3 | P4 | P5 | C1 | C2 | C3 |
| (1) Alkoxysilyl group-containing modified epoxy resin | Synthesis Example 1 | 15 | — | 20 | 25 | 28 | — | — | — |
| | Synthesis Example 2 | — | 25 | — | — | — | — | — | — |
| (2) Epoxy resin heat latent curing agent | Amicure VDH-J | — | — | 10 | 10 | — | — | — | — |
| | Curezole 2E4MZ-A | 3 | 3 | 3 | 3 | 3 | 3 | 3 | 3 |
| (3) Filler | Mirex XLC-LL | 30 | 25 | — | — | 34 | 35 | 35 | 30 |
| | MU-120 | — | — | — | — | — | 2 | 12 | 2 |
| | CR-10 | 17 | 16 | 27 | 17 | 15 | 20 | 10 | 15 |
| | F351 | — | — | — | — | 10 | | | |
| (4) Epoxy resin having at least 1.2 epoxy groups in the molecule | Epomic R140P | — | 3 | — | 25 | 5 | — | 10 | 15 |
| | EOCN-1020-75 | 10 | — | 15 | — | — | 10 | — | — |
| | Synthesis Example 3 | 10 | 10 | 10 | 20 | — | 10 | 10 | 10 |
| (5) Solvent Additive | Dowanol PGDA | 15 | 18 | 15 | — | — | 15 | 15 | 5 |
| | KBM403 | — | — | — | — | 5 | 5 | 5 | 20 |

(1) Alkoxysilyl group-containing modified epoxy resin

Synthesis Example 1: Bisphenol F liquid epoxy resin modified with N-phenyl-3-aminopropyltrimethoxysilane and tetramethoxysilane Synthesis Example 2: Glycidyl group- and hydroxyl group-containing acrylic copolymer modified with N-phenyl-3-aminopropyltrimethoxysilane and tetramethoxy silane (2) Epoxy Resin Heat Latent Curing Agent Amicure VDH-J:

1,3-bis(hydrazinocarboethyl)-5-isopropyl hydantoin manufactured by Ajinomoto

Curezole 2E4MZ-A:

2,4-diamino-6-[2'-ethyl-4'-methylimidazolyl-(1')]-ethyl-s-triazine

Mirex XLC-LL: xylylene phenol resin manufactured by Mitsui Chemicals (3) Fillers MU-120: fine silica particles manufactured by Shin-Etsu Chemical CR-10: amorphous alumina manufactured by Vikousky [phonetic]

F351: core/shell acryl particles manufactured by Zeon Kasei (4) Epoxy Resin having at Least 1.2 Epoxy Groups in the Molecule Epomic R140P: bisphenol A liquid epoxy resin manufactured by Mitsui Chemicals EOCN-1020-75: o-cresol novolak epoxy resin manufactured by Nippon Kayaku Synthesis Example 3: acryl rubber modified epoxy resin (5) Dowanol PGDA: propylene glycol diacetate manufactured by Dow Chemical Additive KBM403: γ-glycidoxypropyltrimethoxysilane

TABLE 2

Test results of liquid crystal sealing compositions

| Test Items | Example 1 | Example 2 | Example 3 | Example 4 | Example 5 | Comparative Example 1 | Comparative Example 2 | Comparative Example 3 |
|---|---|---|---|---|---|---|---|---|
| Liquid crystal sealing composition | P1 | P2 | P3 | P4 | P5 | C1 | C2 | C3 |
| Measurement results of glass transition temperature (° C.) of cured product | 133 | 130 | 142 | 145 | 148 | 115 | 101 | 115 |
| Result of joining seal test | | | | | | | | |
| Disturbed seal line | absent | absent | absent | absent | absent | present | present | present |
| Foaming in seal | absent | absent | absent | absent | absent | present | present | present |
| Sheet heat press suitability | suitable | suitable | suitable | suitable | suitable | unsuitable | unsuitable | unsuitable |
| Results of adhesion test | ○ | ○ | ○ | ○ | ○ | Δ | ○ | ○ |
| Results of heat resistant adhesion test | ○ | ○ | ○ | ○ | ○ | Δ | X | Δ |
| Results of adhesive test | ○ | ○ | ○ | ○ | ○ | Δ | X | X |

INDUSTRIAL APPLICABILITY

The liquid crystal sealing composition of the present invention is excellent in adhesiveness, moisture permeation resistance and heat resistance and is thus useful as a sealing agent for display panel in various instruments.

What is claimed is:

1. A one-component liquid crystal sealing composition comprising (1) an alkoxysilyl group-containing modified epoxy resin obtained by de-alcohol condensation reaction of (a) an epoxy resin having at least one hydroxyl group in one molecule and (b) an alkoxysilyl group-containing compound represented by formula (2):

[Formula 2]

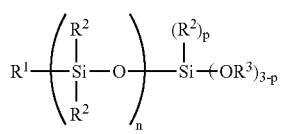

wherein $R^1$ represents a C1 to C8 alkyl group, a phenyl group or a C1 to C8 alkenyl group, each of which may have a C1 to C8 alkoxy group, vinyl group, acryloyl group, methacryloyl group, carboxyl group, epoxy group, glycidyl group, amino group and mercapto group, $R^2$ represents a C1 to C8 alkoxysilyl group, a C1 to C8 alkyl group or a phenyl group, $R^3$ represents a C1 to C8 alkyl group, n is an integer of 0 to 6, and p is an integer of 0 to 2, (2) a heat latent epoxy curing agent and (3) a filler having an average particle diameter of 0.1 to 10 μm.

2. The one-component liquid crystal sealing composition according to claim 1, further comprising (4) epoxy resin having at least 1.2 epoxy groups on average in one molecule.

3. The one-component liquid crystal sealing composition according to claim 2, wherein the alkoxysilyl group-containing modified epoxy resin (1) is contained in an amount of 1 to 30% by weight based on 100% by weight of the liquid crystal sealing composition.

4. The one-component liquid crystal sealing composition according to claim 2, wherein at least one kind of the heat latent epoxy curing agent (2) is an amine-based heat latent curing agent, and its melting point or its softening temperature as determined by a ring and ball method is 100° C. or more.

5. The one-component liquid crystal sealing composition according to claim 2, wherein at least one kind of the heat latent epoxy curing agent (2) is an imidazole-based curing agent having a melting point of 130° C. or more.

6. The one-component liquid crystal sealing composition according to claim 2, wherein the filler (3) is contained in an amount of 5 to 30% by weight based on 100% by weight of the liquid sealing composition.

7. The one-component liquid crystal sealing composition according to claim 2, wherein (5) an aprotic solvent compatible with epoxy resin and inert to an epoxy group and having a boiling point in the range of 140 to 220° C. is contained in an amount of 5 to 30% by weight based on 100% by weight of the liquid crystal sealing composition.

8. A method of producing a liquid crystal display panel, which comprises applying the one-component liquid crystal sealing composition of claim 2 on a sealing site of a liquid crystal display panel and heat curing the composition.

9. A liquid crystal display panel produced by the method of producing a liquid crystal display panel according to claim 8.

10. The one-component liquid crystal sealing composition according to claim 1, wherein the alkoxysilyl group-containing modified epoxy resin (1) is contained in an amount of 1 to 30% by weight based on 100% by weight of the liquid crystal sealing composition.

11. The one-component liquid crystal sealing composition according to claim 1, wherein at least one kind of the heat latent epoxy curing agent (2) is an amine-based heat latent curing agent, and its melting point or its softening temperature as determined by a ring and ball method is 100° C. or more.

12. The one-component liquid crystal sealing composition according to claim 1, wherein at least one kind of the heat latent epoxy curing agent(2) is an imidazole-based curing agent having a melting point of 130° C. or more.

13. The one-component liquid crystal sealing composition according to claim 1, wherein the filler (3) is contained in an amount of 5 to 30% by weight based on 100% by weight of the liquid sealing composition.

14. The one-component liquid crystal sealing composition according to claim 1, wherein (5) an aprotic solvent compatible with epoxy resin and inert to an epoxy group and having a boiling point in the range of 140 to 220° C. is contained in an amount of 5 to 30% by weight based on 100% by weight of the liquid crystal sealing composition.

15. A method of producing a liquid crystal display panel, which comprises applying the one-component liquid crystal sealing composition of claim 1 on a sealing site of a liquid crystal display panel and heat curing the composition.

16. A liquid crystal display panel produced by the method of producing a liquid crystal display panel according to claim 15.

* * * * *